United States Patent
Shi et al.

(10) Patent No.: US 7,092,726 B2
(45) Date of Patent: Aug. 15, 2006

(54) METHOD AND SYSTEM FOR DETERMINING A LOCATION USING A PLURALITY OF SELECTED INITIAL LOCATION ESTIMATES

(75) Inventors: Qicai Shi, Coral Springs, FL (US); Neiyer S. Correal, Cooper City, FL (US); Paul E. Gorday, West Palm Beach, FL (US); Spyros Kyperountas, Coral Springs, FL (US); Feng Niu, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 156 days.

(21) Appl. No.: 10/747,377

(22) Filed: Dec. 29, 2003

(65) Prior Publication Data

US 2005/0143100 A1  Jun. 30, 2005

(51) Int. Cl.
*H04Q 7/20* (2006.01)
(52) U.S. Cl. .................. 455/456.6; 455/41.2; 342/451; 342/463
(58) Field of Classification Search ............. 455/456.1, 455/456.6, 41.2; 342/451, 463; 370/328
See application file for complete search history.

(56) References Cited

U.S. PATENT DOCUMENTS 5,883,598 A * 3/1999 Parl et al. ................... 342/457
6,473,038 B1 * 10/2002 Patwari et al. .............. 342/450
6,728,545 B1 * 4/2004 Belcea ..................... 455/456.2
6,912,386 B1 * 6/2005 Himberg et al. ............ 455/423
2004/0034465 A1 * 2/2004 Spiesberger ................ 701/200
2005/0143101 A1 * 6/2005 Kyperountas et al. ... 455/456.6

FOREIGN PATENT DOCUMENTS

WO   WO 03/107595 A1 * 12/2003

OTHER PUBLICATIONS

Patwari, N. et al., "Relative Location Estimation in Wireless Sensor Networks", Signal Processing, IEEE Transactions on, vol. 51, Issue 8, Aug. 2003, p. 2137-48.*

* cited by examiner

*Primary Examiner*—Charles Appiah
*Assistant Examiner*—Julie E Stein
(74) *Attorney, Agent, or Firm*—Lawrence J. Chapa

(57) ABSTRACT

A method and system is provided for determining a location for each of a plurality of units, which is selected from one of multiple sets of locations, which are each estimated based upon different initial location estimates. The selected set of locations includes the set which has the minimum error value, where the error value is based on the aggregate of the differences between the range determined from the estimated locations and the measured range. By using different sets of initial location estimates, there is a greater chance that at least one of the sets of initial location estimates will avoid any local minimums and produce a more accurate estimate of unit locations.

24 Claims, 5 Drawing Sheets

METHOD AND SYSTEM FOR DETERMINING A LOCATION USING A PLURALITY OF SELECTED INITIAL LOCATION ESTIMATES

STATEMENT REGARDING FEDERALLY SPONSORED RESEARCH OR DEVELOPMENT

This invention was made with United States Government support under 70NANB2H3001 awarded by the National Institute of Standards and Technology (NIST). The United States Government has certain rights in the invention.

FIELD OF THE INVENTION

The present invention relates generally to the determining a location of a unit operating within a network including a plurality of units, and more particularly, to the use of a plurality of initial location estimates, based upon an established possible location area for each of the units, which are being located.

BACKGROUND OF THE INVENTION

There are several instances in which it may be desirable to track and or estimate the location of individual units within a network. In at least some of these instances, some of the more traditional methods, such as global positioning systems (GPS), may have difficulties. One such example includes, when the units being tracked are located internal to a building. This is because GPS signals may have difficulties penetrating the walls of a building and/or traversing other obstructions. In some of the same or other instances, there may be an insufficient number of range measurements relative to one or more reference units, whose locations are either known or determined, to allow for the position of a particular unit to be triangulated.

In at least some of these instances, it may be possible to use measured range information between at least some of the units to allow a location estimate to be determined for one or more units. In at least one such instance, an error value associated with the estimate including, in at least one instance, a sum of the square of the differences between the measured range information, and the range information corresponding to the computed spatial between a pair of units, and associated with a set of estimated locations is minimized, through an iterative minimization process. At least one such example of a corresponding system and method is described in Patwari et al., U.S. Pat. No. 6,473,038, the disclosure of which is incorporated herein by reference. However, in some instances, depending on how the initial location estimate is selected, an iterative approach, which minimizes an error value may become trapped in a local minimum, and have difficulties converging to a more accurate solution. Consequently, it would be beneficial to develop an approach, which is more likely to identify a solution, which avoids a local minimum solution.

The present inventors have recognized that an approach, which selects a plurality of different sets of initial location estimates, which are each used to iteratively estimate a location for each of a plurality of units in a network, would be beneficial in arriving at a solution, which more readily avoids any local minimums. Of the plurality of location estimates, which are determined, the solution set having the smallest error value is selected and used as the location estimate for the plurality of units. The present inventors have further recognized that it would be beneficial for the different sets of initial location estimates to be selected from a possible location area determined for each of the units. In this way, a system and method for improved location estimation accuracy can be provided.

SUMMARY OF THE INVENTION

The present invention provides a method for determining a location of a plurality of units, each unit being communicatively coupled to at least some of the other plurality of units, where at least some of the plurality of units are in communication range with one or more reference units, whose locations are at least one of determined and known. The method includes measuring range information between each of the units and any reference units within communication range of one another. A possible location area is then established for each of the units including a plurality of possible initial location estimates.

An initial location estimate is then selected for each of the units, whose location is not known, from an area proximate to the possible location area, and a location is estimated for each of the units, which minimizes an error value, based on the difference between the measured range values and a range calculated from the estimated location values. The selection of initial location estimates using a different set of initial location estimates for each of the units from the plurality of possible initial location estimates, and the estimation of a location for each of the units, which minimizes an error value, is then repeated at least once. The set of location estimates from the repeated estimations having the smallest minimized error value is then selected.

In at least one embodiment, selecting an initial location estimate for each of the units includes randomly selecting a location from the plurality of possible initial locations from the established possible location area.

In at least a further embodiment, selecting an initial location estimate for each of the units includes sequentially selecting a location from a sub-set of the plurality of possible initial locations associated with the established possible location area, which are spaced in a predesignated pattern across the possible location area.

In a still further embodiment, the method further includes making a determination relative to the units having links with a sufficient number of reference units to determine a location via triangulation, and then triangulating the location for each of the identified units, and identifying the triangulated units as reference units during subsequent processing in which the triangulated location remains valid.

The present invention further provides a system for determining the location for each of a plurality of units in a multi-hop network, each unit being communicatively coupled to at least some of the other plurality of units, wherein at least some of the plurality of units are in communication range with one or more reference units, whose location is at least one of determined or known. The system includes a transceiver, which is adapted for receiving connectivity and range information for the plurality of units and the reference units in communication range with one another, and a processor, coupled to the transceiver.

The processor includes a storage area for maintaining the connectivity, communication range information, and multiple sets of location estimates and corresponding minimized error values. The processor further includes a calculation module adapted for determining possible location areas for each of the units and estimating a location for each of the units, which minimizes an error value, based upon each set of initial location estimates. The processor still further includes one or more selection modules for sequentially selecting multiple different sets of initial location estimates associated with the possible location areas for each of the units, and selecting the set of estimated locations, which is associated with the smallest minimized error value.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
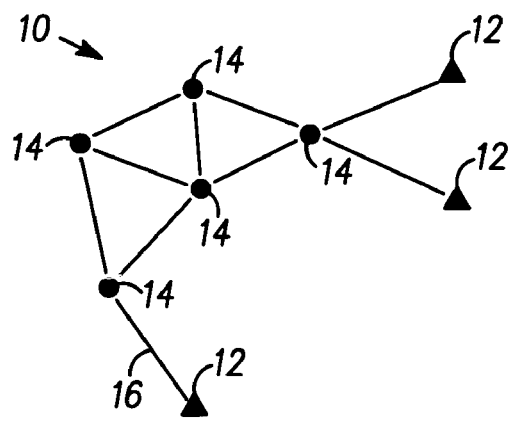
FIG. 1 is a partial spatial overview diagram illustrating an exemplary spatial relationship between nearby members of at least a portion of a communication network, in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a partial spatial overview diagram providing an exemplary spatial relationship between nearby members of at least a portion of a communication network 10, in accordance with at least one embodiment of the present invention. The network 10 includes reference units 12, which are represented as triangles, and whose locations are known or able to be determined, and a plurality of blind units 14, which are represented as circles. The blind units 14 correspond to units, whose locations are to be estimated. In at least the illustrated embodiment, the network 10 is a multi-hop network, which corresponds to networks, where some of the pairs of units can not communicate directly, and/or need to communicate via another unit within the network 10. Units, which are capable of communicating directly with one another, are shown with a line 16 extending between the units. One of said lines is shown in the drawings associated with the corresponding reference number.

Each unit, generally, includes a transceiver and corresponding antenna, which support wireless communication between the other units within communication range. Through the communication between adjacent units, a range estimate is determined, based upon the characteristics and/or the timing of a received signal. In at least one embodiment, one or more of a received signal strength indication, time of arrival measurement, time difference of arrival measurement, and/or angle of arrival measurement is used to determine a measured range value. For example, one could measure the received signal strength and knowing the strength of the signal, when transmitted, one could compute a range estimate, based on a model which predicts signal strength degradation as a function of distance. As a further example, one could determine the time of propagation of a signal transmitted between a pair of units, and approximate a range between the units, based on an approximation of the rate of travel of the signal and the determined time of propagation. In some instances, a round trip communication can be used to determine propagation delay. One skilled in the art will readily appreciate, that additional techniques exist for approximating a range between units, based upon the characteristics and/or the timing associated with a received signal, and that the same could similarly be used without departing from the teachings of the present invention.

Once ranging information is established between adjacent units, including nearby reference units, an initial location for each of the non-reference units can be selected. An iterative process is then used to update the initial and subsequent location estimates, until an error value associated with the difference between the determined distance, based on the selected coordinates, and the distance, based upon the measured range information, is no longer decreasing, and ideally is minimized. However, with some error minimization techniques it is possible to become trapped within a local minimum. In some of these instances, deviations from the local minimum appear to increase the error value, and as a result bias the values back toward the local minimum. One such example of a local minimum, shown in two dimensions, is illustrated in FIG. 2.

Figure 2:
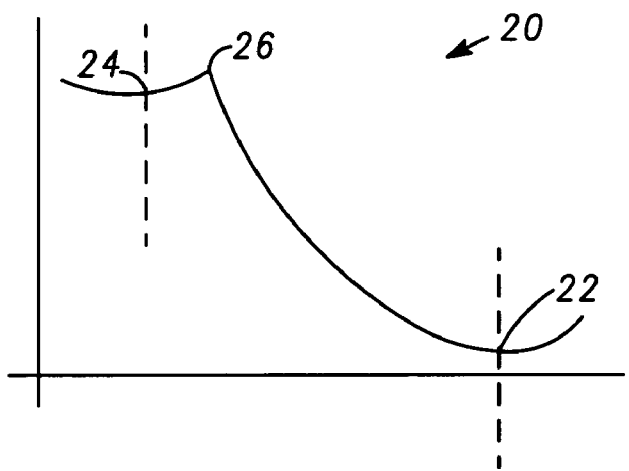
FIG. 2 is a partial exemplary graph illustrating error values associated with different location estimates of one or more units.

More specifically, FIG. 2 illustrates a partial graph 20 of exemplary error values associated with different location estimates of one or more units. Often times, a graph illustrating error values will be more than two-dimensional. Nevertheless, local minimums can similarly occur in instances, where there are a greater number of dimensions. In the illustrated example, the graph includes a minimum value 22 and a local minimum 24. Local minimums can be created by a cusp 26, ridge, or high spot, which is located between the local minimum 24 and the actual minimum 22, and which can bias the iterative solution away from the actual minimum 22, depending upon what side of the cusp 26 you are located when you start. Because, a starting point can make a big difference as to whether you converge to a local minimum 24 or an actual minimum 22, choosing initial values for the values that are being determined can be important.

Recognizing that initial estimates can affect, whether a solution converges to a local minimum 24, or converges to an actual minimum 22, an approach which selects initial estimates has been developed, which attempts to increase the opportunity to identify a solution, that will converge to an actual minimum 22. Generally, in accordance with at least one aspect of the present invention, multiple different sets of initial location estimates are used.

Figure 3:
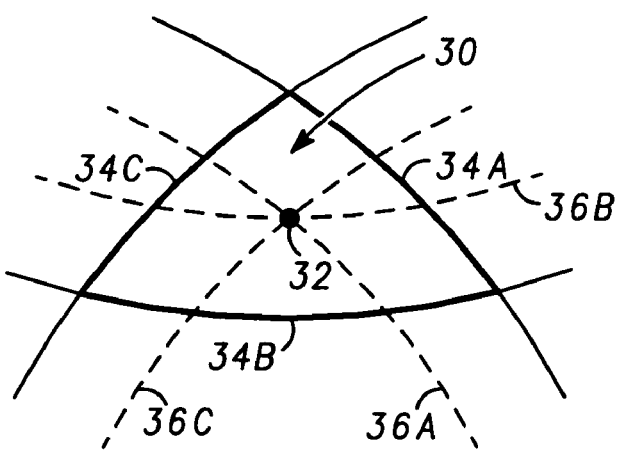
FIG. 3 is a partial spatial overview illustrating overlapping communication regions for multiple units in communication with a common unit, and an approximated location, based on an exemplary embodiment including a set of ranges between the multiple units and the common unit.

In at least some instances, the possible location of a unit can be defined by an area, which can be determined. FIG. 3 illustrates a possible location area 30 for a unit to be located. More specifically, FIG. 3 is a partial spatial overview illustrating overlapping communication regions for multiple units, which are in communication with a unit to be located 32, based upon a set of predetermined transmission ranges of the multiple units and the unit to be located 32. For example, if a unit to be located 32 can receive the transmissions from three different units, then the unit to be located 32 is probably located in an area 30 where the transmission regions, bounded by arcs 34A–C, for each of the three different units overlap. This is not unlike triangulation, however instead of converging to an approximate position, based upon a determined range between each of the units and a unit to be located 32. The area 30 is defined by an estimated predefined transmission range 34 for each of the units. An example of a more definite location, as potentially determined through triangulation, is illustrated as the convergence of three approximated distances 36A–C between the unit to be located 32 and the other units.

Where the initial location is uncertain for one of the units having an estimated predefined transmission range, which is being used to help define a possible location area 30, the predefined transmission range 34 could be increased by an amount corresponding to the amount of uncertainty, which would serve to further expand the possible location area 30.

Once an area is defined in which a unit is likely to be located, initial location estimates can be selected that are associated with that area. Such a selection of initial location estimates can include any one or more of several different approaches without departing from the teachings of the present application, however in at least one aspect of the present application multiple different sets of initial location estimates are selected. In some embodiments, initial location estimates can be randomly selected. In other embodiments, initial location estimates can be generally uniformly spaced apart. In still further embodiments, the initial location estimates can be selected based upon a predetermined distribution pattern. Furthermore, in some instances the initial location estimates will be confined to a determined possible location area, while in other instances, some of the initial location estimates may deviate outside of the possible location area.

Figure 4:
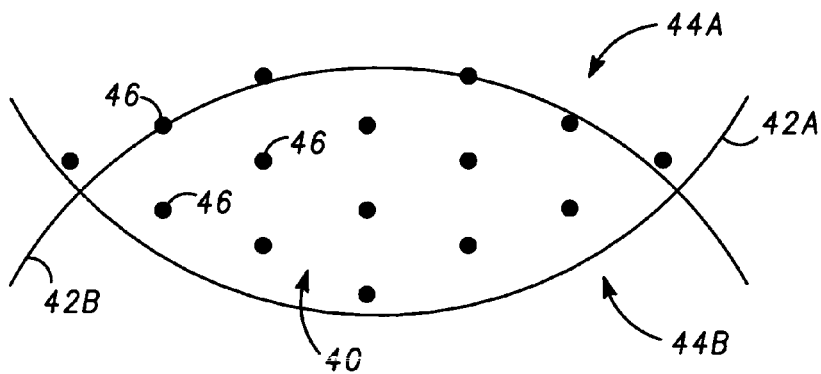
FIG. 4 is a partial spatial overview illustrating overlapping communication regions for multiple units forming a possible location area for a unit in communication with the multiple units, and a set of possible initial location estimates.

FIG. 4 illustrates a partial spatial overview highlighting a possible location area 40 bounded by a pair of arcs 42A and 42B, which could correspond to a pair of overlapping communication regions 44A and 44B for a pair of units (not shown) in communication with a unit to be located (not shown). Additionally illustrated is an exemplary set of possible initial location estimates 46 for the unit to be located, shown as a set of dots, only some of which are expressly associated with the reference number. In the illustrated embodiment, the initial location estimates 46 are generally evenly spaced across the possible location area 40. In at least a couple of instances, the initial location estimates 46 fall outside of the possible location area 40. In some instances, it may be desirable to adjust any locations, which fall outside of the possible location area, so as to be inside of the area. The actual spacing may be dependent upon the number of location estimates 46 that will be used.

Figure 5:
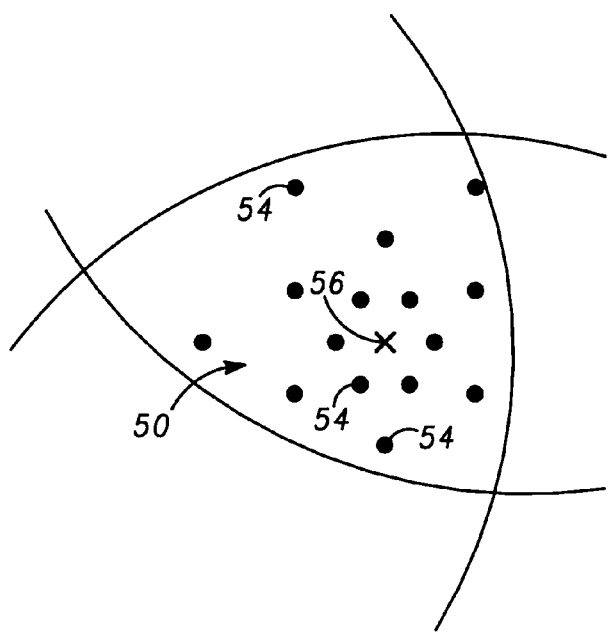
FIG. 5 is a partial spatial overview illustrating overlapping communication regions for multiple units forming a possible location area for a unit in communication with the multiple units, and a set of possible initial location estimates.

FIG. 5 illustrates a partial spatial overview highlighting a possible location area 50 bounded by three arcs 52A–C. Similar to FIG. 4, FIG. 5 additionally illustrates an exemplary set of possible initial location estimates 54. However, dissimilar from FIG. 4, the exemplary set of possible initial location estimates 54 are spaced apart in a predefined or predesignated pattern. In the illustrated embodiment, the predefined pattern is centered about a location 56, which could correspond to a best guess initial estimate based upon any predefined criteria, which can be either related or unrelated to the concepts discussed herein. One possible embodiment may position the predefined pattern, based upon a previously determined position. In the particular pattern illustrated, the location density of the initial location estimates 54 is greater with a closer proximity to the best guess initial location estimate 56. One skilled in the art will readily recognize that still further predefined patterns could alternatively be used without departing from the teachings of the present invention.

Figure 6:
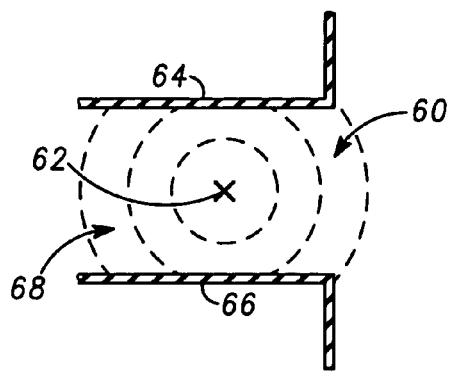
FIG. 6 is a partial spatial overview illustrating a possible location area for a unit, based upon a known prior location, a rate of travel and an elapsed time, since the unit was at the last known location.

In a still further alternative, a possible location area can take into account environmental features, which may limit or preclude the unit from being located in a certain area, and/or impede the unit from traveling through or entering into other areas. FIG. 6 illustrates a partial spatial overview of a possible location area 60 for a unit, based upon a known prior location 62. In the illustrated embodiment, the possible location is further based upon an assumed or possible rate of travel, and an elapsed time, since the unit was at the last known location 62. A pair of walls 64 and 66, which define a passageway 68 and correspondingly limit movement of unit, are used to more specifically define a possible location area 60.

In yet a still further alternative, a possible location area can be determined, which similarly takes into account a previously determined location and inertial navigation information received from the unit. For example, the unit may incorporate a pedometer, which can track the number of steps a person carrying the unit takes, or an odometer, which can track the distance that a wheel travels. Further, the unit could further incorporate a compass, which might provide a direction of travel relative to the measured distance of travel. Alternatively, the unit could include one or more gyroscopes, which can detect movement and/or acceleration in a particular direction.

In some instances, the previously determined location can be a location, based upon an alternative location technology, which may be available in an area, that the unit being tracked is departing from, but which may not available in the new area in which the unit being tracked is entering into. One such example could include a global positioning system, where the units are triangulated relative to a network of satellites or base stations, where the location technology may be unavailable after the unit enters a building. There may be a degree of certainty relative to a previously determined location, from which a subsequent possible location area can be determined and/or estimated.

Figure 7:
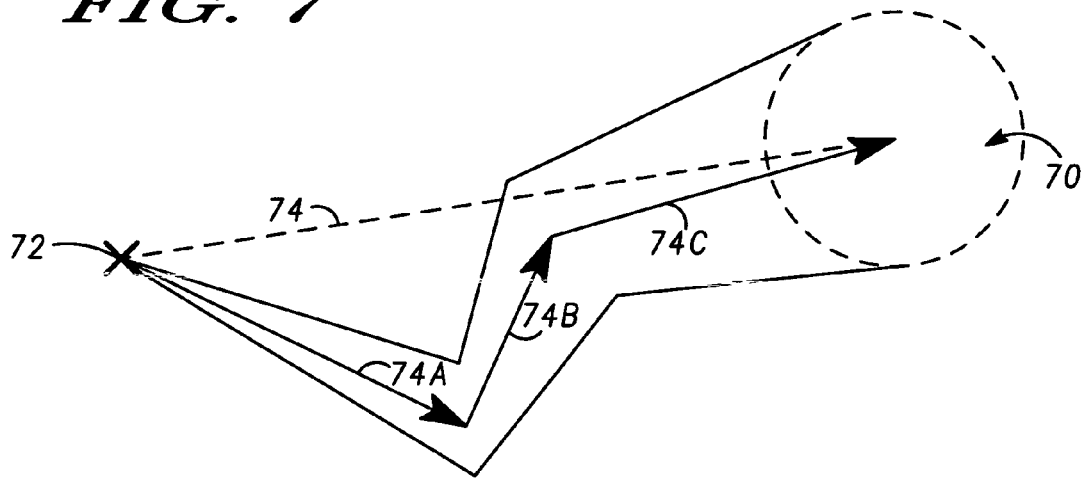
FIG. 7 is a partial spatial overview illustrating a possible location area for a unit, based upon a known prior location, and a movement estimate.

FIG. 7 illustrates is a partial spatial overview of a possible location area 70 for a unit, based upon a known prior location 72, and a movement estimate 74, which as noted above, can incorporate some form of inertial navigation estimation. The movement estimate 74 can be a single distance and direction vector, and may be an averaged or an integrated value. Alternatively, the movement estimate 74 can include a plurality of different vectors or components 74A–C, and corresponding a plurality of associated directions. FIG. 7 further illustrates the possible cumulative effects of uncertainty in the inertial navigation estimation, and how it may result in a possible location area 70 from which initial estimates can be pulled from.

Figure 8:
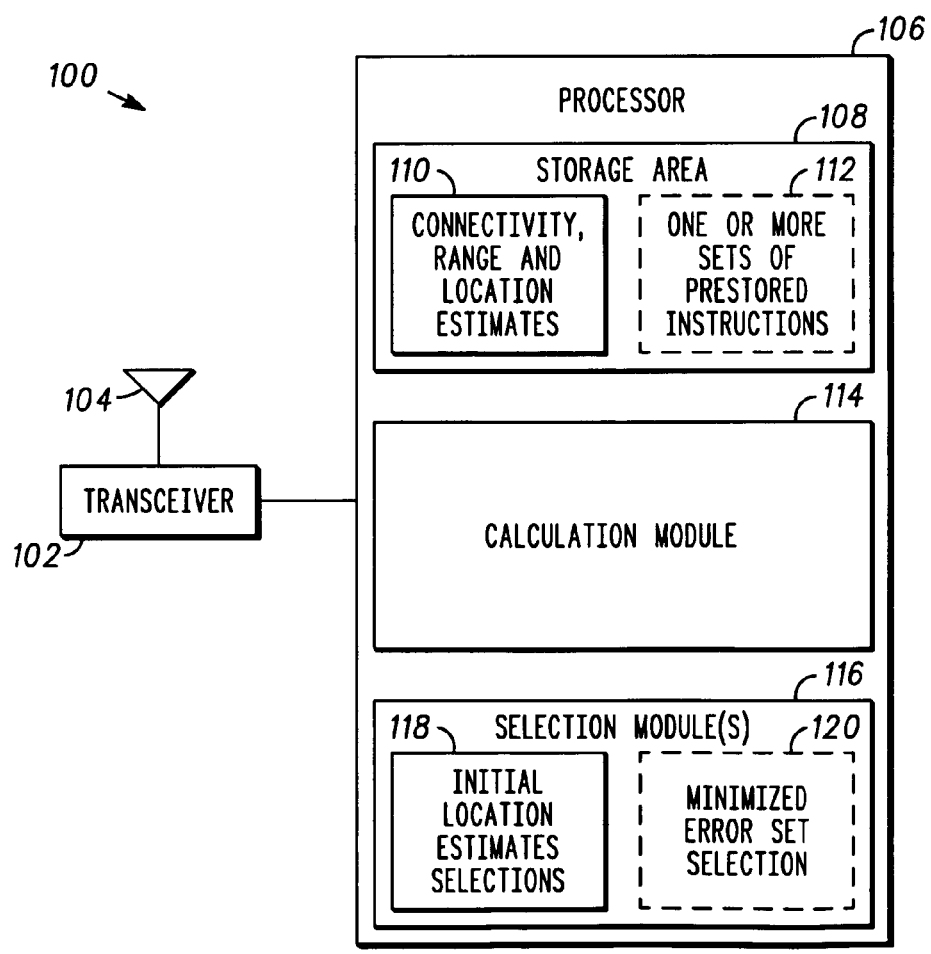
FIG. 8 is a block diagram illustrating a system for determining the location for each of a plurality of units in a multi-hop network, in accordance with at least one embodiment of the present invention.

FIG. 8 illustrates a block diagram of a system 100 for determining the location for each of a plurality of units in a multi-hop network, in accordance with at least one embodiment of the present invention. The system 100 for determining the location can be incorporated in one or more of the units to be located, or alternatively could be located in another unit, which is at least communicatively coupled to the units to be located, via one or more hops, such as a reference unit.

The system 100 includes a transceiver 102 coupled to an antenna 104 for facilitating communication with other units, by which the measured range information detected by each of the units, and information for determining a possible location area can be received. The transceiver 102 could be compatible with many forms of communication including communications using a cellular telephone radio transceiver, a cordless telephone radio transceiver, a wireless LAN connection, a short range radio transceiver, such as a Bluetooth transceiver, an infra-red communication transceiver, or other similar communication device. One skilled in the art will appreciate, that still further forms of communication and/or combinations thereof would similarly be possible.

The system 100 further includes a processor 106 coupled to the transceiver 102. The processor 106 includes a storage area 108 for receiving and storing connectivity and range information, and for retaining the one or more location estimates and corresponding error values associated with the location estimates 110. The storage area 108 can further include one or more sets of prestored instructions 112.

The processor 106 additionally includes a calculation module 114, which is adapted for determining possible location areas for each of the units and determining a location estimate for each of the units, based upon a set of initial location estimates, which minimizes an error value. The processor 106 still further includes one or more selection modules 116. In at least one embodiment, the processor includes a selection module 118 for selecting initial location estimates, and a selection module 120 for selecting a minimized error set. In some embodiments, the calculation module 114 and the one or more selection modules 116 will be implemented as at least some of the one or more sets of prestored instructions 112.

In at least one embodiment, the processor 106 could take the form of a specialized or general purpose computer, which includes one or more microprocessors for executing one or more sets of prestored instructions 112. The processor could further include one or more types of storage and or memory, some of which could be coupled to or incorporated within the microprocessor for storing program data and the one or more sets of prestored instructions. Examples of different types of storage include one or more forms of volatile and/or non-volatile memory including conventional ROM, EPROM, RAM, or EEPROM. Still further, the different types of storage could include auxiliary storage, such as fixed or removable media including magnetic disk or optical disc drives.

Figure 9:
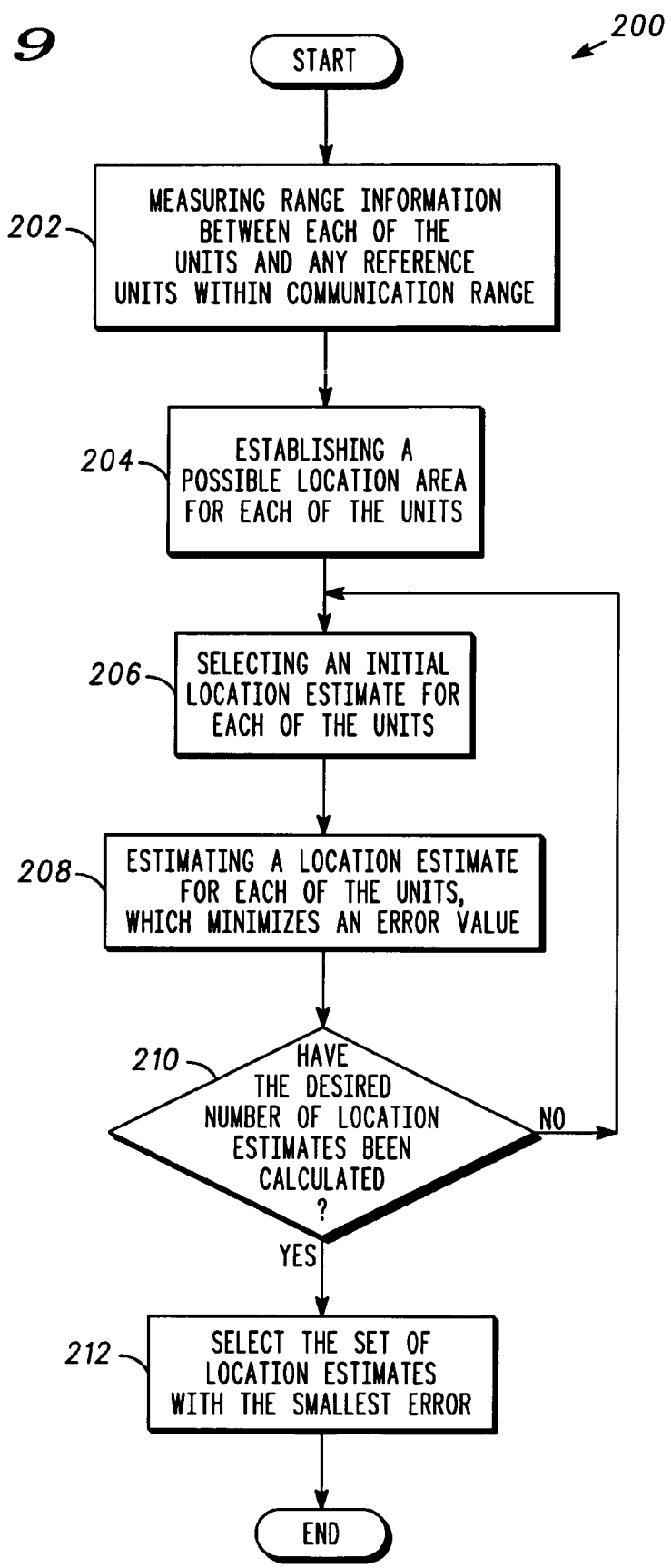
FIG. 9 is a flow diagram illustrating a method of determining a location of a plurality of units, in accordance with at least one embodiment of the present invention.

FIG. 9 illustrates a flow diagram of a method 200 for determining a location of a plurality of units, in accordance with at least one embodiment of the present invention. The method 200 generally includes measuring the range information between each of the units and any reference units within communication range 202. As noted above, this can be accomplished in at least several different ways. At least a couple of examples include using a received signal strength indication, time of arrival measurement, and time difference of arrival measurement. A possible location area is then established 204 for each of the units. An initial location is then selected 206 for each of the units, based upon a possible location area established for each of the units. A location estimate is then made 208 for each of the units, which minimizes an error value.

In at least some instances, a record is maintained of the determined location estimates and the corresponding minimized error value. A determination is then made 210, as to whether the desired number of location estimates have been calculated. In at least some instances, the desired number of location estimates may be a fixed predetermined number. However in other instances, the desired number of location estimates may be a function of other factors. For example, the desired number of location estimates may change dependent upon the size of the one or more possible location areas for each of the units to be located.

Still further, the desired number of location estimates having been met or exceeded may be a function of the minimum error values, which have been determined. For example, the desired number of location estimates can be defined to have been met, if an error value below a predetermined threshold has been found. This could alternatively be represented as a further conditional which potentially interrupts the loop and causes the method flow to leave the loop prior to reaching an alternatively defined predetermined number of location estimate calculations. Further yet, the desired number of location estimates having been calculated may be said to have been met, if both a reduced predetermined number has been exceeded and an error value has been found which is less than a predetermined threshold. One skilled in the art will appreciate that further alternatives are possible without departing from the teachings of one skilled in the art.

In any event, until the desired number of location estimates have been calculated, a new set of initial location estimates is selected 206 and is used to determine a location estimate 208 for each of the units, and subsequently repeated. After the desired number of location estimates have been determined, and/or the calculation of location estimates have otherwise been interrupted, the set of location estimates with the smallest error is selected 212.

In at least one embodiment, the error estimate is a function of the sum of the square of the differences between the measured range information, and the computed distance between the estimated locations. During each location estimation, an iterative approach is used, which attempts to minimize the error value.

As noted previously, in connection with at least FIGS. 4–5, at least several possibilities exist for selecting initial location estimates including randomly selecting an initial estimate proximate to a determined possible location area, sequentially selecting spaced apart initial location estimates relative to the possible location area. Where the initial location estimates are sequentially selected from spaced apart initial location estimates, the location estimates can be generally equally spaced, or alternatively they could be arranged in a predetermined pattern having varying densities, relative to the possible location area. In some instances, the initial location estimates will have the greatest densities proximate to an area, which is consistent with a best guess location.

Figure 10:
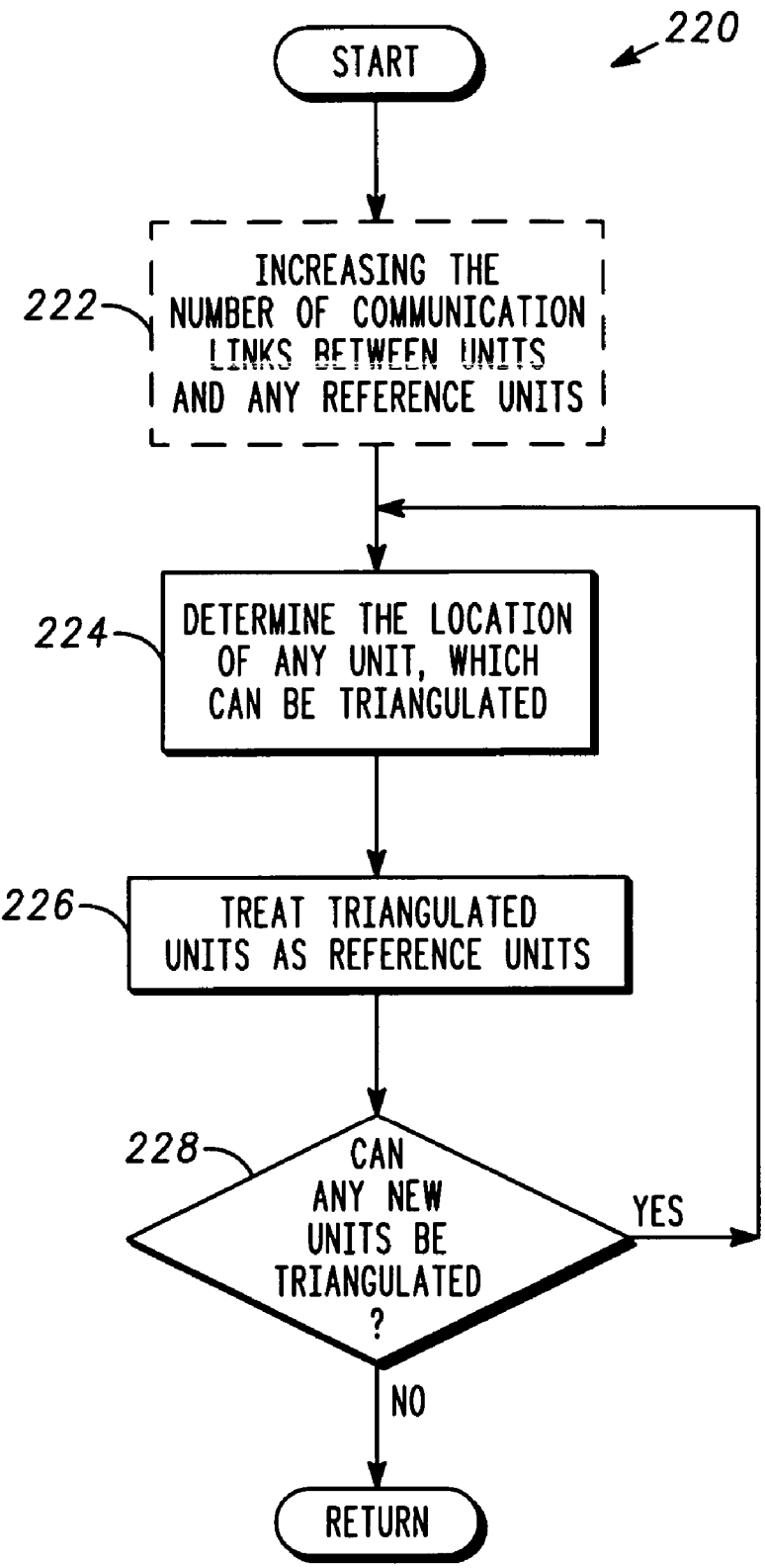
FIG. 10 is a more specific flow diagram illustrating the determination and triangulation of the units having a sufficient number of links, as part of or in addition to the step of measuring range information in accordance with at least one embodiment of FIG. 9.

In a further embodiment, as illustrated in FIG. 10, the number of units whose location needs to be determined can be minimized by determining the location of some of the units through where possible an alternative location determination means. For example, it may be possible to determine a location of one of more of the units through triangulation 224, if a sufficient number of range estimates exist between a unit to be located and a sufficient number of reference units. Still further, any unit whose location is determined through triangulation could in turn be classified or treated as a reference unit 226, at least during a period in which the triangulated location remains valid. In turn, this may allow still further units to be more definitively located through an alternative location determination means, such as triangulation. This process can be repeated until no additional units can be located in this manner 228.

It is further possible, that as part of the location process for purposes of triangulation, or in connection with the method of locating a plurality of units, as provided in FIG. 9, the number of communication links and corresponding range measurements may be enhanced 222 by increasing the power and correspondingly the range of any wireless communication between units.

Generally, the described method 200 and system 100 can be used in connection with the location of units in a plurality of environments. At least one such example includes the location of devices such as one or more cellular telephones or other devices located within a network. Additionally, the system 100 can be used to track the locations of items stored in a warehouse.

Still further examples include the incorporation of units to be located as part of the equipment for one or more groups of people operating in concert within a given area or environment. One such example includes emergency personnel. In this instance the units to be located could be incorporated in or co-located with one or more of a fire fighter's helmet, jacket, or other piece of equipment. One skilled in the art will appreciate, that the present method and system for locating a plurality of units will also be equally applicable to other environments.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of determining a location of a plurality of units, each unit being communicatively coupled to at least some of the other plurality of units, wherein at least same of the plurality of units are in communication range with one or more reference units, whose locations are at least one of determined and known, said method comprising:

measuring range information between each of the units and any reference units within communication range of one another;

establishing a possible location area for each of the units including a plurality of possible initial location estimates;

selecting an initial location estimate for each of the units, whose location is not known, from an area corresponding to the possible location area;

estimating a location for each of the units, which minimizes an error value, based on the difference between the measured range values and a range calculated from the estimated location values;

repeating, at least once, the selection of initial location estimates using a different set of initial location estimates for each of the units from the plurality of possible initial location estimates and the estimation of a location for each of the units, which minimizes an error value; and selecting the set of location estimates from the repeated estimations having the smallest minimized error value.

2. A method in accordance with claim 1 wherein measuring range information between each of the units and any reference units within communication range of one another includes at least one of measuring received signal strength indicator, angle of arrival, time of arrival, and time difference of arrival for signals transmitted by one or more of the units.

3. A method in accordance with claim 1 wherein establishing a possible location area for each of the units includes determining the overlapping area, based upon the communication range and known or estimated locations of other units communicatively coupled to the unit for which the possible location area is being determined.

4. A method in accordance with claim 1 wherein establishing a possible location area for each of the units includes determining a known previous location, and estimating an amount of possible deviation during an interval of time that has elapsed since the unit was at the previous known location.

5. A method in accordance with claim 4 wherein the possible deviation is based upon an estimated rate of travel and the time interval since the unit was at the previous known location.

6. A method in accordance with claim 4 wherein the possible deviation is based upon an inertial navigation estimation during the time subsequent the previous known location.

7. A method in accordance with claim 1 wherein selecting an initial location estimate for each of the units includes randomly selecting a location from the plurality of possible initial locations from the established possible location area.

8. A method in accordance with claim 1 wherein selecting an initial location estimate for each of the units includes sequentially selecting a location from a sub-set of the plurality of possible initial locations from the established possible location area, which are spaced in a predesignated pattern relative to the possible location area.

9. A method in accordance with claim 8 wherein the predesignated pattern includes locations, which are substantially evenly spaced apart.

10. A method in accordance with claim 9 wherein the distance of the spacing is based upon the size of the possible location area and a predetermined number of the repeated iterations of location estimations.

11. A method in accordance with claim 1 wherein minimizing the error includes minimizing the sum of the square of the difference between the range, based upon the estimated location, and the measured range.

12. A method in accordance with claim 1 wherein estimating a location for each of the units includes after selecting an initial location estimate for each of the units, iteratively estimating an updated location for each of the units at least until the error value is no longer getting smaller.

13. A method in accordance with claim 1 further comprising increasing the communication range of at least some of the plurality of units.

14. A method in accordance with claim 1 further comprising determining the units having links with a sufficient number of reference units to determine a location via triangulation, triangulating the location for each of the identified units, and identifying the triangulated units as reference units during subsequent processing in which the triangulated location remains valid.

15. A method in accordance with claim 14 wherein if any of the units have been newly triangulated and identified as reference units, repeating the attempt to triangulate further units, and subsequently identified as reference units, until no further units can be triangulated.

16. A system for determining the location for each of a plurality of units in a multi-hop network, each unit being communicatively coupled to at least some of the other plurality of units, wherein at least some of the plurality of units are in communication range with one or more reference units, whose location is at least one of determined or known, said system comprising:
   a transceiver for receiving connectivity and range information for the plurality of units and the reference units in communication range with one another; and
   a processor coupled to the transceiver, the processor including
      a storage area for maintaining the connectivity, communication range information, and multiple sets of location estimates and corresponding minimized error values,
      a calculation module adapted for determining possible location areas for each of the units and estimating a location for each of the units, which minimizes an error value, based upon each set of initial location estimates, and
      one or more selection modules for sequentially selecting multiple different sets of initial location estimates corresponding to the possible location areas for each of the units, and selecting the set of estimated locations, which is associated with the smallest minimized error value.

17. A system in accordance with claim 16 wherein at least one of the calculation modules and the one or more selection modules includes one or more sets of pre-stored instructions.

18. A system in accordance with claim 17 wherein the one or more sets of pre-stored instructions are stored in the storage area.

19. A system in accordance with claim 16 wherein the one or more selection modules is adapted for randomly selecting an initial location estimate from the corresponding possible location area for each of the units.

20. A system in accordance with claim 16 wherein the one or more selection modules is adapted for sequentially selecting an initial location estimate from the corresponding possible location area for each of the units, which are spaced apart in a predesignated pattern.

21. A system in accordance with claim 16 wherein the system for determining the location is incorporated as part of one of the units to be located.

22. A system in accordance with claim 16 wherein at least some of the units are mobile communication devices.

23. A system in accordance with claim 22 wherein at least some of the mobile communication devices are cellular radiotelephones.

24. A system in accordance with claim 16 wherein at least some of the units include equipment used by a group of individuals acting in concert.

* * * * *